US010891171B2

(12) United States Patent
Pan et al.

(10) Patent No.: US 10,891,171 B2
(45) Date of Patent: Jan. 12, 2021

(54) METHOD, APPARATUS AND DEVICE FOR TRANSITIONING BETWEEN DATA AND CONTROL CORE AND MIGRATING CLOCK TASK FROM DATA CORE TO CONTROL CORE

(71) Applicant: Huawei Technologies Co., Ltd., Shenzhen (CN)

(72) Inventors: Xuesong Pan, Shenzhen (CN); Jianfeng Xiu, Shenzhen (CN); Zichang Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 15/901,291

(22) Filed: Feb. 21, 2018

(65) Prior Publication Data
US 2018/0181447 A1    Jun. 28, 2018

Related U.S. Application Data

(63) Continuation of application No. PCT/CN2016/091058, filed on Jul. 22, 2016.

(30) Foreign Application Priority Data

Jan. 18, 2016  (CN) .......................... 2016 1 0032714

(51) Int. Cl.
*G06F 9/52*    (2006.01)
*G06F 9/48*    (2006.01)
(Continued)

(52) U.S. Cl.
CPC .............. *G06F 9/52* (2013.01); *G06F 9/4812* (2013.01); *G06F 9/4825* (2013.01);
(Continued)

(58) Field of Classification Search
CPC ........ G06F 9/5088; G06F 9/5038; G06F 9/46; G06F 9/4881; G06F 9/52; G06F 9/4856;
(Continued)

(56) References Cited

U.S. PATENT DOCUMENTS 6,397,340 B2 *  5/2002  Watts, Jr. ................ G06F 1/206
                                                  713/322
7,080,001 B2 *  7/2006  Moriyama .............. G06F 21/55
                                                  713/600
(Continued)

FOREIGN PATENT DOCUMENTS

CN        101246438 A      8/2008
CN        102081555 A      6/2011
(Continued)

OTHER PUBLICATIONS

Foreign Communication From a Counterpart Application, European Application No. 16885977.5, Extended European Search Report dated Jul. 16, 2018, 9 pages.
(Continued)

*Primary Examiner* — Abu Zar Ghaffari
(74) *Attorney, Agent, or Firm* — Conley Rose, P.C.

(57) ABSTRACT

A clock task processing method includes before or when running a service process by using at least one data core, disabling a clock interrupt of the at least one data core, and processing a clock task in the at least one data core by using at least one control core of multiple control cores that cannot process service data.

18 Claims, 7 Drawing Sheets

(51) Int. Cl.
*G06F 9/50* (2006.01)
*G06F 9/46* (2006.01)

(52) U.S. Cl.
CPC .......... *G06F 9/4856* (2013.01); *G06F 9/4881* (2013.01); *G06F 9/5088* (2013.01); *G06F 9/46* (2013.01)

(58) Field of Classification Search
CPC ...... G06F 9/4812; G06F 9/4825; G06F 9/524; G06F 1/324; G06F 1/3237; G06F 1/329; G06F 9/30076; Y02D 10/22; Y02D 10/24; Y02D 10/126; Y02D 10/128
See application file for complete search history.

(56) References Cited

U.S. PATENT DOCUMENTS

| | | | | |
|---|---|---|---|---|
| 7,415,561 | B2* | 8/2008 | Jinzaki | G06F 13/24 710/263 |
| 7,418,585 | B2* | 8/2008 | Kissell | G06F 9/30043 712/244 |
| 7,617,408 | B2* | 11/2009 | Frazier | G06F 1/14 370/508 |
| RE42,293 | E* | 4/2011 | Oh | G06F 1/06 713/320 |
| 8,327,187 | B1 | 12/2012 | Metcalf | |
| 8,438,404 | B2* | 5/2013 | Duvalsaint | G06F 9/5027 713/300 |
| 8,504,753 | B2* | 8/2013 | Danko | G06F 9/30076 710/262 |
| 8,732,371 | B2* | 5/2014 | Berezecki | G06F 9/4812 710/264 |
| 9,459,890 | B2* | 10/2016 | Brooks | G06F 9/455 |
| 9,712,611 | B2* | 7/2017 | Narayana | H04L 67/1002 |
| 10,250,467 | B2* | 4/2019 | Bragstad | H04L 43/04 |
| 2006/0064529 | A1* | 3/2006 | Anand | G06F 13/24 710/260 |
| 2006/0150185 | A1 | 7/2006 | McKenney et al. | |
| 2007/0067771 | A1* | 3/2007 | Kulbak | G06F 9/4843 718/100 |
| 2007/0198759 | A1* | 8/2007 | Agarwal | G06F 13/26 710/260 |
| 2011/0302589 | A1* | 12/2011 | Aussagues | G06F 9/3851 718/104 |
| 2012/0134320 | A1 | 5/2012 | Khawer et al. | |
| 2012/0221756 | A1 | 8/2012 | Ye | |
| 2014/0006820 | A1 | 1/2014 | McKenney | |
| 2014/0082240 | A1* | 3/2014 | Coleman | G06F 9/4812 710/260 |
| 2014/0082630 | A1 | 3/2014 | Ginzburg et al. | |
| 2014/0181537 | A1* | 6/2014 | Manne | G06F 1/3296 713/300 |
| 2014/0282587 | A1* | 9/2014 | Argon | G06F 9/5027 718/104 |
| 2014/0380084 | A1 | 12/2014 | McKenney | |
| 2015/0033051 | A1* | 1/2015 | Gendler | G06F 1/10 713/322 |
| 2015/0058657 | A1* | 2/2015 | Archer | G06F 1/324 713/600 |
| 2015/0067368 | A1* | 3/2015 | Henry | G06F 1/3237 713/322 |
| 2015/0339164 | A1* | 11/2015 | Muthiah | H04L 67/1002 718/104 |
| 2016/0139970 | A1* | 5/2016 | Araujo | G06F 13/4027 719/318 |
| 2017/0038791 | A1* | 2/2017 | Park | G06F 1/08 |

FOREIGN PATENT DOCUMENTS

| | | |
|---|---|---|
| CN | 102375761 A | 3/2012 |
| CN | 102662740 A | 9/2012 |
| CN | 104679583 A | 6/2015 |
| CN | 105183668 A | 12/2015 |
| CN | 105718320 A | 6/2016 |
| EP | 2602964 A1 | 6/2013 |
| EP | 2637096 A1 | 9/2013 |

OTHER PUBLICATIONS

Foreign Communication From a Counterpart Application, Chinese Application No. 201610032714.X, Chinese Office Action dated Aug. 3, 2018, 6 pages.
Machine Translation and Abstract of Chinese Publication No. CN101246438, Aug. 20, 2008, 13 pages.
Machine Translation and Abstract of Chinese Publication No. CN102662740, Sep. 12, 2012, 10 pages.
Machine Translation and Abstract of Chinese Publication No. CN104679583, Jun. 3, 2015, 29 pages.
Machine Translation and Abstract of Chinese Publication No. CN105718320, Jun. 29, 2016, 38 pages.
Foreign Communication From a Counterpart Application, PCT Application No. PCT/CN2016/091058, English Translation of International Search Report dated Oct. 27, 2016, 2 pages.
Machine Translation and Abstract of Chinese Publication No. CN105183668, Dec. 23, 2015, 18 pages.
Foreign Communication From a Counterpart Application, Chinese Application No. 201610032714.X, Chinese Office Action dated Jan. 22, 2020, 10 pages.

* cited by examiner

METHOD, APPARATUS AND DEVICE FOR TRANSITIONING BETWEEN DATA AND CONTROL CORE AND MIGRATING CLOCK TASK FROM DATA CORE TO CONTROL CORE

CROSS-REFERENCE TO RELATED APPLICATIONS

This application is a continuation of International Application No. PCT/CN2016/091058, filed on Jul. 22, 2016, which claims priority to Chinese Patent Application No. 201610032714.X, filed on Jan. 18, 2016. The disclosures of the aforementioned applications are hereby incorporated by reference in their entireties.

TECHNICAL FIELD

The present disclosure relates to the field of communications technologies, and in particular, to a clock task processing method, apparatus, and device.

BACKGROUND

In a multi-core computer, multiple cores are generally classified into a control core and a data core. The control core is configured to perform functions such as control, maintenance, and system management. The data core is configured to run a service process of a to-be-processed service, and process service data. To implement high-speed data processing, generally, a single service process exclusively occupies a single central processing unit (CPU) resource. However, as a performance requirement imposed on network data processing is increasingly higher, a maximum delay that is allowed in single service data processing by a data core at a time and required by a user is continuously decreased. However, in an operating system running on a multi-core computer, a periodic clock interrupt on each data core is a main factor resulting in a delay in single processing by the data core, and further becomes a main factor that affects service performance and stability of the operating system. A clock interrupt period is generally set to a time ranging from several milliseconds (ms) to tens of milliseconds, and most commonly, set to 4 ms or 10 ms at present.

Conventionally, to meet a high-speed network data service processing requirement and eliminate impact of a clock interrupt in an operating system on service performance, a tickless mechanism may be used in the industry. In the operating system, a specified data core enters into a NO_HZ_FULL mode in which almost no interrupt occurs. That is, when the data core needs to run only one process or has no process to run, the clock interrupt period is prolonged.

However, by using such a mechanism, when the data core is running a service process, it still needs to be ensured that at least one clock interrupt arrives within 1 second (s). That is, a maximum clock interrupt period is 1 s, and the clock interrupt is not completely disabled. When the clock interrupt arrives, and the data core is processing service data, a heavy service delay and jitter occur.

SUMMARY

The present disclosure provides a clock task processing method, apparatus, and device, so as to resolve a problem that service processing efficiency is affected because a service delay or jitter is severe when a data core in a conventional operating system processes service data.

Specific technical solutions provided in the present disclosure are as follows.

In an aspect, an embodiment of this application provides a clock task processing method. The method can be used in a multi-core computer operating system, and the operating system runs on a physical host including multiple data cores and multiple control cores. The method includes the following: before or when running a service process of a to-be-processed service by using at least one data core of the multiple data cores, the operating system disables a clock interrupt of the at least one data core that runs the service process. In this way, the method can ensure that no clock interrupt occurs when the at least one data core subsequently runs the service process, thereby reducing service jitter and a service delay, and improving processing efficiency of the operating system. In addition, the operating system processes, by using at least one control core of the multiple control cores, a clock task submitted by the service process, for example, at least one first clock task submitted by the service process. This can ensure that a service function of the operating system runs normally, and avoid a delay and congestion in clock task processing.

In a possible design, the operating system performs service configuration for the at least one data core, that is, binds the service process of the to-be-processed service and the at least one data core. This ensures that the service process runs on only the at least one data core, and avoids migration of the service process.

In a possible design, when the operating system runs the service process by using the at least one data core, each time the service process submits a new first clock task, the operating system submits the newly submitted first clock task to a specified task queue. The specified task queue varies with a task type of the newly submitted first clock task. For example, when the first clock task is a delay task, the specified task queue is a task queue of the at least one control core; or when the first clock task is a read-copy update (RCU) callback task, the specified task queue is a common orphan queue in the operating system. The operating system processes the at least one first clock task in the specified task queue by using the at least one control core. The clock interrupt of the at least one data core that runs the service process has already been disabled. Therefore, during a subsequent running process of the service process, the newly submitted first clock task is processed by using a control core. This can ensure that a service function of the operating system runs normally, and avoid a delay and congestion in clock task processing.

In a possible design, the operating system receives, by using a control interface, a clock interrupt control instruction (an instruction for disabling a clock interrupt) sent by a user or another device, and disables the clock interrupt of the at least one data core according to the instruction for disabling a clock interrupt. After running the at least one service process by using the at least one data core, the operating system receives, by using the control interface, a clock interrupt control instruction (an instruction for restoring a clock interrupt) sent by the user or the another device, and restores the clock interrupt of the at least one data core according to the instruction for restoring a clock interrupt.

In a possible design, when the at least one data core has at least one second clock task, after the operating system disables the clock interrupt of the at least one data core, the operating system determines a task type of the at least one second clock task. When the task type of the at least one second clock task is the same as that of the first clock task, the operating system further needs to migrate the at least one second clock task in the at least one data core to the specified task queue, and then processes, by using the at least one control core, the at least one second clock task that is migrated to the specified task queue. In this way, the operating system can ensure that when the at least one data core has the at least one second clock task, the operating system migrates the second clock task, so as to avoid a delay and congestion in clock task processing.

In a possible design, when the first clock task is a delay task, and the specified task queue is a task queue of the at least one control core, during a clock interrupt corresponding to a time requirement of each first clock task of the at least one first clock task, the operating system processes, by using at least one control core, the first clock task that is corresponding to the clock interrupt and that is in the task queue of the at least one control core.

In a possible design, when the first clock task is an RCU callback task, and the specified task queue is an orphan queue of the operating system, during a clock interrupt corresponding to a time requirement of each first clock task of the at least one first clock task, after the operating system processes an RCU callback task in the at least one control core by using the at least one control core, the operating system processes the first clock task that is corresponding to the clock interrupt and that is in the orphan queue.

In a possible design, when the operating system processes, by using the at least one control core, the first clock task that is corresponding to the clock interrupt and that is in the orphan queue, which is described above, the operating system first receives status information reported by a control core of the at least one control core. The status information indicates that an original target data core of the first clock task corresponding to the clock interrupt has already undergone a static state. The operating system processes, according to the received status information and by using the control core that reports the status information, the first clock task that is corresponding to the clock interrupt and that is in the orphan queue.

The original target data core is a data core to which the first clock task is supposed to be submitted when the clock interrupt of the at least one data core is not disabled. The status information is sent when the control core determines that the original target data core is not in a specified read critical section of a grace period at a moment of the clock interrupt, and determines that the original target data core has already undergone a static state. A start moment of the specified read critical section is prior to an enabling moment of the grace period. An end moment of the specified read critical section is within the grace period or beyond an end moment of the grace period.

The grace period refers to a time for completing critical sections of RCU read operations that are currently being executed by all cores. The read critical section refers to a time that is for currently reading a common resource by a process and in which another process cannot release the common resource. The common resource is a shared resource available to only one process at a time. The static state is an execution state of a core. During a period in which the core is in a static state, any data protected by RCU is not applied by a task executed on the core, and only after the core has undergone the static state, the data previously protected by the RCU can be released.

In a possible design, the operating system detects a quantity of data packets of the to-be-processed service, and separately compares the quantity of data packets with a first threshold and a second threshold. When the quantity of data packets is greater than the first threshold, the operating system changes a control core of the multiple control cores into a data core, so that the data core runs the service process; or adds a data core other than the at least one data core of the multiple data cores, so that the added data core runs the service process.

When the quantity of data packets is less than the second threshold, the operating system changes a data core of the at least one data core into a control core. A quantity of data cores is greater than or equal to 2.

The first threshold is greater than the second threshold.

In the foregoing manner, the operating system may adjust, according to a service requirement and a load status of the at least one data core, quantities of data cores running the service process and the multiple control cores at any time, thereby improving expandability of the operating system and improving core resource utilization.

In a possible design, when determining to switch a process address space identifier (ASID) group, the operating system sets a flush flag for the multiple data cores and the multiple control cores in the physical host. The flush flag indicates that the operating system switches the process ASID group, so that at least one core of the multiple data cores and the multiple control cores performs, according to the flush flag, translation lookaside buffer (TLB) flushing during process switching. When any data core or control core subsequently performs process switching, the core determines whether the core has the flush flag. When the core has the flush flag, the core performs TLB flushing. When any data core of the at least one data core performs TLB flushing, the operating system has already restored the clock interrupt of the data core whose clock interrupt is previously disabled. In this way, an inter-processor interrupt (IPI) is avoided when the data core processes service data, thereby further reducing service jitter and a service delay, and improving processing efficiency of the operating system.

In a possible design, when the at least one data core further runs another process, before the operating system runs the service process by using the at least one data core, and disables the clock interrupt of the at least one data core, the operating system needs to migrate the another process in the at least one data core to the multiple control cores, or migrate the another process in the at least one data core to a data core other than the at least one data core of the multiple data cores. In this way, before the at least one data core runs the service process, the process in the at least one data core is cleared, and the service process of the to-be-processed service is directly run subsequently, thereby improving efficiency of processing the to-be-processed service by the at least one data core, and ensuring security of the operating system.

In another aspect, an embodiment of this application provides a clock task processing apparatus. The apparatus is configured in a physical host including multiple data cores and multiple control cores. The apparatus has functions of implementing operating system behaviors in the foregoing method design. The functions can be implemented by hardware, or can be implemented by using hardware to execute corresponding software. The hardware or software includes one or more modules corresponding to the foregoing functions. The modules may be software and/or hardware.

In a possible design, a structure of the apparatus includes a first processing unit, a control unit, and a second processing unit. The first processing unit is configured to run at least one service process of a to-be-processed service by using at least one data core of the multiple data cores.

The control unit is configured to disable a clock interrupt of the at least one data core.

The second processing unit is configured to process, by using at least one control core of the multiple control cores, at least one first clock task submitted by the at least one service process. The at least one first clock task is a task completed by relying on a clock interrupt, and the at least one first clock task is submitted after the clock interrupt is disabled.

In still another aspect, an embodiment of this application provides a clock task processing device. The device includes a multi-core processor, a memory, a clock source, and a communications bus. The multi-core processor, the clock source, and the memory are connected by using the communications bus. The multi-core processor includes multiple data cores and multiple control cores.

The clock source is configured to generate a clock interrupt, and synchronize the clock interrupt to a core of the multi-core processor. The multi-core processor is configured to invoke an instruction in the memory, so as to execute the clock task processing method in the foregoing method design.

According to the clock task processing method provided in the present disclosure, before or when running a service process of a to-be-processed service by using at least one data core of multiple data cores, operating system disables a clock interrupt of the at least one data core of the service process. In this way, the method can ensure that no clock interrupt occurs when the at least one data core subsequently runs the service process, thereby reducing service jitter and a service delay, and improving processing efficiency of the operating system. In addition, the operating system processes, by using at least one control core of multiple control cores, a clock task submitted by the service process, for example, at least one first clock task submitted by the service process. This can ensure that a service function of the operating system runs normally, and avoid a delay and congestion in clock task processing.

DESCRIPTION OF EMBODIMENTS

Figure 1:
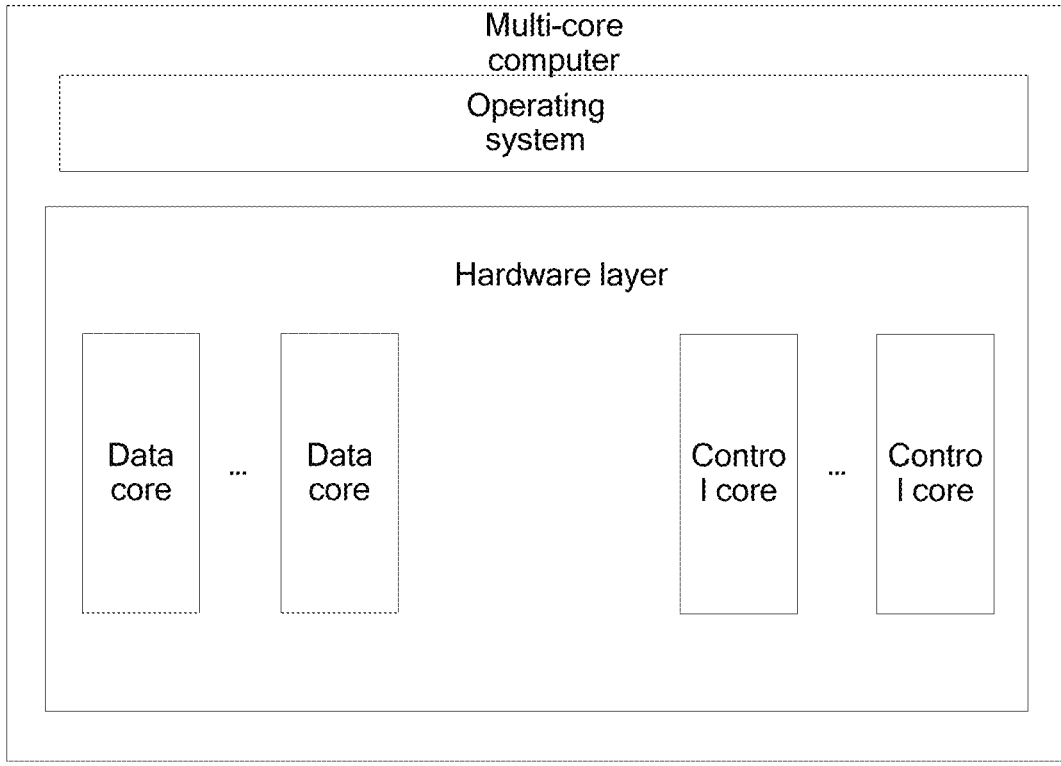
FIG. 1 is a schematic structural diagram of a multi-core computer according to an embodiment of the present disclosure.

To make the objectives, technical solutions, and advantages of the present disclosure clearer, the following further describes the present disclosure in detail with reference to the accompanying drawings. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

The embodiments of the present disclosure provide a clock task processing method, apparatus, and device, so as to resolve a problem that service processing efficiency is affected because a service delay or jitter is severe when a data core in a conventional operating system processes service data. The method and the apparatus of the present disclosure are based on a same inventive concept. Because the method and the apparatus resolve problems by using similar principles, mutual reference may be made for implementation of the apparatus and implementation of the method, and repeated details are not described.

In the following, expositions are given for some terms in this application, so as to help persons skilled in the art have a better understanding.

"Multiple" means two or more.

The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In the embodiments of the present disclosure, a multi-core computer operating system runs at least one service process of a to-be-processed service by using at least one data core of multiple data cores, disables a clock interrupt of the at least one data core, and then processes, by using at least one control core of multiple control cores, a clock task submitted by the at least one service process. There is no limitation on a sequence between the two steps of running the at least one service process by using the at least one data core and disabling the clock interrupt of the at least one data core, which are performed by the operating system. Before or when running the at least one service process by using the at least one data core, the operating system disables the clock interrupt of the at least one data core. Therefore, no clock interrupt occurs when the at least one data core subsequently runs the at least one service process, thereby reducing service jitter and a service delay, and improving processing efficiency of the operating system. In addition, the operating system processes, by using a control core that cannot process service data, a clock task submitted by the at least one service process. This can avoid a delay and congestion in clock task processing, and ensure that a service function of the operating system runs normally.

The clock task processing method provided in the embodiments of the present disclosure is applicable to a multi-core computer operating system. A hardware layer of the multi-core computer includes multiple cores, and a structure of the multi-core computer is shown in FIG. 1. The multiple cores may be classified into two types: a data core and a control core. The data core is configured to process service data of a to-be-processed service, so as to constitute a data plane of the multi-core operating system. The control core is configured to implement functions such as control, maintenance, and system management, so as to constitute a control plane of the multi-core operating system.

When the multi-core computer operating system needs to process a to-be-processed service, the operating system runs at least one service process of the to-be-processed service by using at least one data core of multiple data cores, disables a clock interrupt of the at least one data core, then processes, by using some or all control cores in multiple control cores, at least one first clock task submitted by the at least one service process, that is, submits the at least one first clock task to a specified task queue, and migrates at least one second clock task in the at least one data core to the specified task queue. The first clock task and the second clock task may be tasks that can be completed by relying on a clock interrupt, such as delay tasks, or RCU callback tasks. The specified task queue is specifically set according to different task types of clock tasks.

Quantities of the data cores and the control cores may be configured by a user or set by the operating system. When the operating system runs the at least one service process of the to-be-processed service by using the at least one data core, the operating system may detect a quantity of data packets of the to-be-processed service, and adjust the quantities of the data cores and the control cores according to the quantity of data packets, thereby improving core resource utilization and expandability of the operating system.

The multi-core computer shown in FIG. 1 is used to process a service. Before or when running the at least one service process by using the at least one data core, the operating system may disable a clock interrupt of the data core that runs the at least one service process. Therefore, no clock interrupt occurs when the at least one data core subsequently runs the at least one service process, thereby reducing service jitter and a service delay, and improving processing efficiency of the operating system. In addition, the operating system processes, by using a control core that cannot process service data, a clock task submitted by the at least one service process. This can avoid a delay and congestion in clock task processing, and ensure that a service function of the operating system runs normally.

Figure 2:
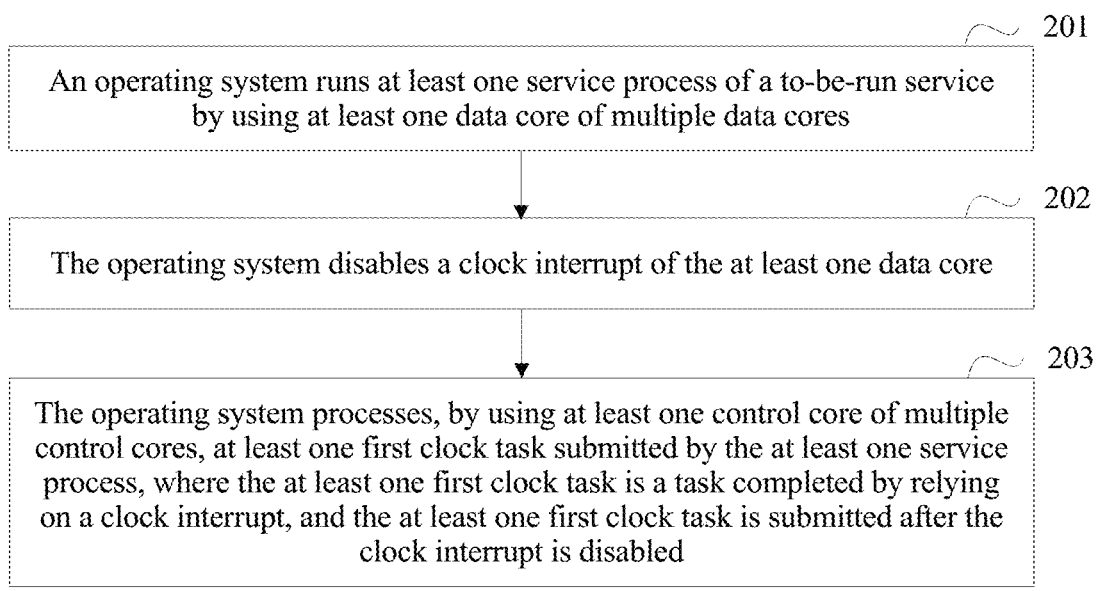
FIG. 2 is a flowchart of a clock task processing method according to an embodiment of the present disclosure.

As shown in FIG. 2, a clock task processing method provided in an embodiment of the present disclosure is applied to the multi-core computer operating system shown in FIG. 1. The operating system runs on a physical host including multiple control cores and multiple data cores. Quantities of the multiple control cores and the multiple data cores (a proportion of the multiple data cores to the multiple control cores) may be set by a user or preset by the operating system. A processing procedure of the method includes the following steps.

Step 201. The multi-core computer operating system runs at least one service process of a to-be-run service by using at least one data core of multiple data cores.

The operating system can control a quantity of data cores that run the at least one service process of the to-be-run service. Optionally, all data cores of the multiple data cores may be used to run the at least one service process, or some data cores of the multiple data cores may be used to run the at least one service process. Specifically, a quantity of data cores that run the at least one service process may be determined according to a quantity, pre-estimated by the operating system, of data packets of the service process, and a specific data core that runs the at least one service process is set with reference to idle resources, a load status, and the like of each data core of the multiple data cores.

Optionally, when the at least one data core further runs another process, before the operating system runs the at least one service process by using the at least one data core, and disables a clock interrupt of the at least one data core, the method further includes the operating system migrates the another process in the at least one data core to the multiple control cores, or migrates the another process in the at least one data core to a data core other than the at least one data core of the multiple data cores.

Conventionally, each data core can run at least one process. Therefore, when the operating system determines that there is a to-be-processed service, the at least one data core may have other processes, such as a service thread, a background thread, and a process for processing an operation of the operating system. Some of these processes may run abnormally after the clock interrupt of the at least one data core is disabled. In addition, when the at least one data core runs another process and a service process of the to-be-processed service at the same time, service processing efficiency of the at least one data core is reduced. Therefore, the operating system migrates all of the other processes in the at least one data core to the multiple control cores or to a data core other than the at least one data core of the multiple data cores. In this way, the processes in the at least one data core may be cleared, and the at least one service process of the to-be-processed service may be directly run, thereby improving efficiency of processing the to-be-processed service by the at least one data core, and ensuring security of the operating system.

When migrating all the other processes in the at least one data core to the control core or to the data core other than the at least one data core, the operating system may implement the migration by using a control group (Cgroup) CPU set (cpuset) subsystem or by controlling a kernel parameter (isolcpus).

In step 201, when the operating system runs the at least one service process by using the at least one data core, the operating system needs to perform service configuration for the at least one data core, that is, binds the at least one service process of the to-be-processed service and the at least one data core. In this way, the at least one service process of the to-be-processed service is run in only the at least one data core, thereby avoiding migration of a service process of the to-be-processed service.

Step 202. The operating system disables a clock interrupt of the at least one data core.

There is no limitation on a sequence between step 202 and step 201. That is, the operating system may first run the service process by using the at least one data core, and then disable the clock interrupt of the at least one data core when the at least one data core runs the at least one service process.

Alternatively, the operating system first disables the clock interrupt of the at least one data core, and then runs the at least one service process by using the at least one data core.

In this way, before or when the at least one data core runs the at least one service process, the operating system disables the clock interrupt of the at least one data core. Therefore, no clock interrupt occurs when the at least one data core subsequently runs the at least one service process, thereby reducing service jitter and a service delay, and improving processing efficiency of the operating system. In the first scenario, during a process from running the service process by the at least one data core to disabling the clock interrupt, a short clock interrupt still occurs. Therefore, in the second scenario, the operating system can reduce a service delay, avoid service jitter, and improve service performance, stability, and timeliness of the operating system to a greatest extent.

In step 202, the operating system may receive, by using a control interface, a clock interrupt control instruction (that is, an instruction for disabling a clock interrupt) sent by a user or another device, and disable the clock interrupt of the at least one data core according to the instruction for disabling a clock interrupt. Alternatively, the operating system may disable, by means of setting by the operating system, the clock interrupt of the at least one data core before or when the operating system runs the at least one service process by using the at least one data core (for example, when the data core has another process and after the another process is migrated).

Correspondingly, after the operating system disables the clock interrupt of the at least one data core, and runs the at least one service process by using the at least one data core, the operating system may also receive, by using the control interface, a clock interrupt control instruction (an instruction for restoring a clock interrupt) sent by the user or the another device, and restores the clock interrupt of the at least one data core according to the instruction for restoring a clock interrupt. Alternatively, the operating system may restore, by means of setting by the operating system, the clock interrupt of the at least one data core after the operating system determines that the to-be-processed service is processed.

After the clock interrupt of the at least one data core is disabled, the at least one data core masks all clock interrupts (clock source events).

Step 203. The operating system processes, by using at least one control core of the multiple control cores, at least one first clock task submitted by the at least one service process, where the at least one first clock task is a task completed by relying on a clock interrupt, and the at least one first clock task is submitted after the clock interrupt is disabled.

Specifically, that the operating system processes, by using the at least one control core, the at least one first clock task submitted by the at least one service process includes the following:

the operating system submits, to a specified task queue, the at least one first clock task submitted by the at least one service process, where the at least one first clock task is obtained when the at least one data core runs the at least one service process; and the operating system processes the at least one first clock task in the specified task queue by using the at least one control core.

The specified task queue is another task queue other than a task queue of the at least one data core, and may be specifically set according to different task types of clock tasks. For example, when the first clock task is a delay task, the specified task queue is a task queue of the multiple control cores; or when the first clock task is an RCU callback task, the specified task queue is a common orphan queue in the operating system.

Although the clock interrupt of the at least one data core has already been disabled, when the at least one data core runs the at least one service process, a service process run by each data core still continuously submits a new clock task. When the operating system determines that a clock interrupt of an original target data core of a newly submitted clock task has already been disabled, the newly submitted clock task is directly submitted to the specified task queue rather than the task queue of the data core.

Optionally, when the at least one data core has at least one second clock task, after the operating system disables the clock interrupt of the at least one data core, the method further includes the following:

the operating system migrates the at least one second clock task in the at least one data core to the specified task queue, where the second clock task and the first clock task are of a same task type; and the operating system processes, by using the at least one control core, the at least one second clock task that is migrated to the specified task queue.

Optionally, when the operating system disables the clock interrupt of the at least one data core, there may be at least one second clock task, in the task queue of the at least one data core, waiting for being processed because another process is run in the at least one data core. The second clock task may also be a task that needs to be completed by relying on a clock interrupt, such as a delay task, an RCU callback task. The clock interrupt of the at least one data core has already been disabled. Therefore, the second clock task in the respective task queue cannot be completed by the at least one data core, and the at least one control core needs to perform processing, so as to avoid a delay and congestion in clock task processing, and ensure that a service function of the operating system runs normally.

Specifically, that the operating system migrates the second clock task in the at least one data core to the specified task queue includes the following:

The operating system traverses a clock task queue of the at least one data core, and migrates a second clock task to the specified task queue if the second clock task exists. For example, if there is a delay task in a delay task queue of the at least one data core, the operating system migrates the delay task to a delay task queue of the at least one control core; and if there is an RCU callback task in an RCU callback task queue of the at least one data core, the operating system migrates the RCU callback task to a common orphan queue of the operating system.

Based on the foregoing descriptions, the operating system processes, by using the at least one control core, the first clock task and the second clock task that are in the specified task queue. The at least one control core of the multiple control cores not only processes such processes as control, maintenance, and system management in the operating system, but also processes clock tasks that are of the at least one control core and of the at least one data core. The at least one control core processes, according to a sequence of time requirements of all the clock tasks, the clock tasks that are of the at least one control core and of the at least one data core. Optionally, the clock task may be a task that needs to be completed by relying on a clock interrupt, such as a delay task and/or an RCU callback task.

In one case, when the first clock task is a delay task and the specified task queue is a task queue of the at least one control core, that the operating system processes the at least one first clock task in the specified task queue by using the at least one control core includes:

during a clock interrupt corresponding to a time requirement of each first clock task of the at least one first clock task, the operating system processes, by using the at least one control core, the first clock task that is corresponding to the clock interrupt and that is in the task queue of the at least one control core.

In a task queue of each control core of the at least one control core, delay tasks are sequenced according to time requirements of the delay tasks. Therefore, a delay task in a task queue of any control core is processed by the control core during a clock interrupt corresponding to a time requirement of the delay task. For example, the delay task is to collect system logs 1 minute later.

In another case, when the first clock task is an RCU callback task and the specified task queue is a common orphan queue in the operating system, that the operating system processes the at least one first clock task in the specified task queue by using the at least one control core includes: during a clock interrupt corresponding to a time requirement of each first clock task of the at least one first clock task, the operating system processes the first clock task that is corresponding to the clock interrupt and that is in the orphan queue after processing an RCU callback task in the at least one control core by using the at least one control core.

Specifically, that the operating system processes, by using the at least one control core, the first clock task that is corresponding to the clock interrupt and that is in the orphan queue includes: the operating system processes, according to status information reported by a control core of the at least one control core and by using the control core, the first clock task that is corresponding to the clock interrupt and that is in the orphan queue, where the status information indicates that an original target data core of the first clock task corresponding to the clock interrupt has already undergone a static state.

The status information is sent when the control core determines that the original target data core is not in a specified read critical section of a grace period at a moment of the clock interrupt, and determines that the original target data core has already undergone a static state. A start moment of the specified read critical section is prior to an enabling moment of the grace period. An end moment of the specified read critical section is within the grace period or beyond an end moment of the grace period.

The grace period refers to a time for completing critical sections of RCU read operations that are currently being executed by all cores. The read critical section refers to a time that is for currently reading a common resource by a process and in which another process cannot release the common resource. The common resource is a shared resource available to only one process at a time. The static state is an execution state of a core. During a period in which the core is in a static state, any data protected by RCU is not applied by a task executed on the core, and only after the core has undergone the static state, the data previously protected by the RCU can be released.

A process in which the at least one control core processes the at least one second clock task in the specified task queue is the same as the process in which the at least one control core processes the at least one first clock task. Details are not described again. Before processing any second clock task in the orphan queue, the at least one control core also needs to report status information to notify the operating system that an original target data core of the second clock task has already undergone a static state. Specific steps are the same as the foregoing manner, and details are not described herein again.

Similar to the delay task, any RCU callback task is processed by a control core during a clock interrupt corresponding to a time requirement of the RCU callback task. For example, the RCU callback task is to release memory space occupied by a data packet A when using of the data packet A by all users ends.

Conventionally, before processing the RCU callback task, a data core or a control core in the operating system needs to report, to the operating system, that the data core or the control core has already undergone a static state. In this embodiment of the present disclosure, the control core needs to process an RCU callback task in the data core. Therefore, before processing the RCU callback task in the data core, the control core needs to perform checking and report that the data core has already undergone a static state.

Figure 3:
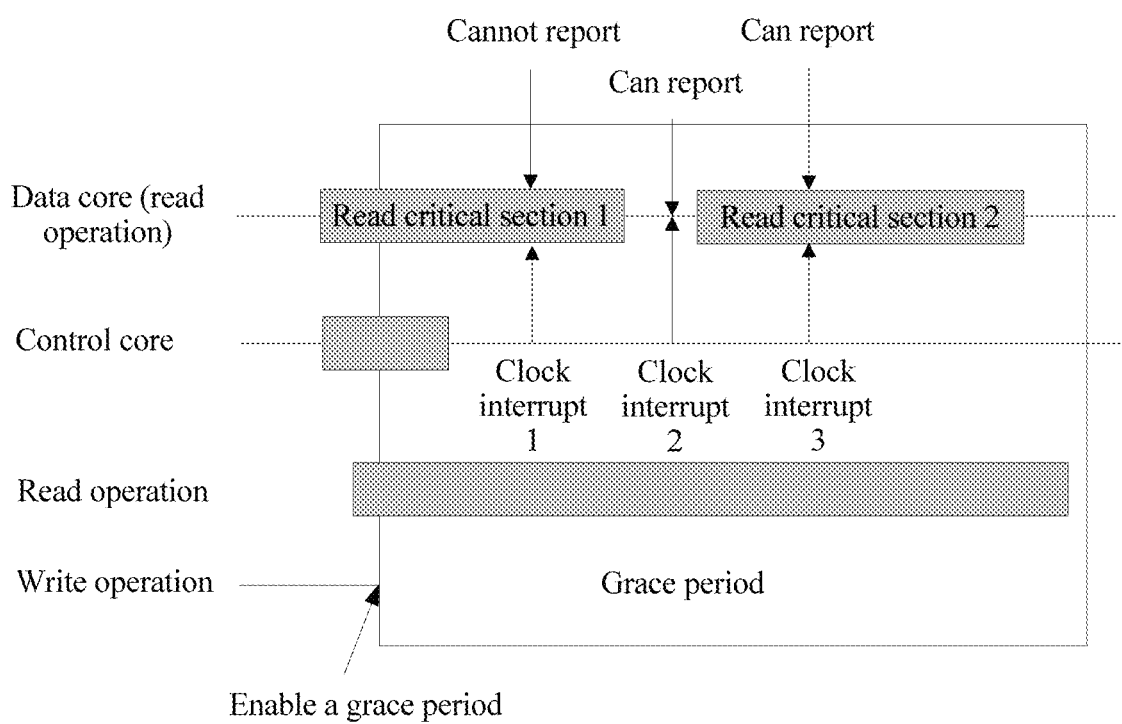
FIG. 3 is a schematic diagram of an occasion for reporting status information by a control core according to an embodiment of the present disclosure.

FIG. 3 is a schematic diagram of an occasion for reporting status information by a control core. The specified read critical section is a read critical section 1 in the figure. When the data core processes the read critical section 1, the data core is in a static state. Therefore, the control core cannot report status information at a clock interrupt (tick 1), but at tick 2 and tick 3 after the data core exits the read critical section 1, the control core can report the status information to notify the operating system that the data core has already undergone a static state.

In conclusion, before the operating system disables a clock interrupt of the at least one data core, the at least one data core and the at least one control core process respective clock tasks in the at least one data core and the at least one control core. After the operating system disables the clock interrupt of the at least one data core, the operating system migrates the at least one second clock task in the at least one data core from a task queue of the at least one data core to a specified task queue, and at least one first clock task obtained when the at least one data core subsequently runs the at least one service process is directly submitted to the specified task queue. In this way, during a clock interrupt corresponding to a time requirement of each first clock task or second clock task, the at least one control core processes the corresponding first clock task or second clock task. The at least one data core can enter into a high-speed real-time service processing mode, and run only the at least one service process of the to-be-processed service.

In this embodiment of the present disclosure, a correspondence may be or may not be set between each data core of the at least one data core that runs the at least one service process and a control core that processes a clock task in the data core.

When a correspondence is set between a data core that runs the at least one service process and a control core, all clock tasks in the data core are processed by the control core.

Figure 4:
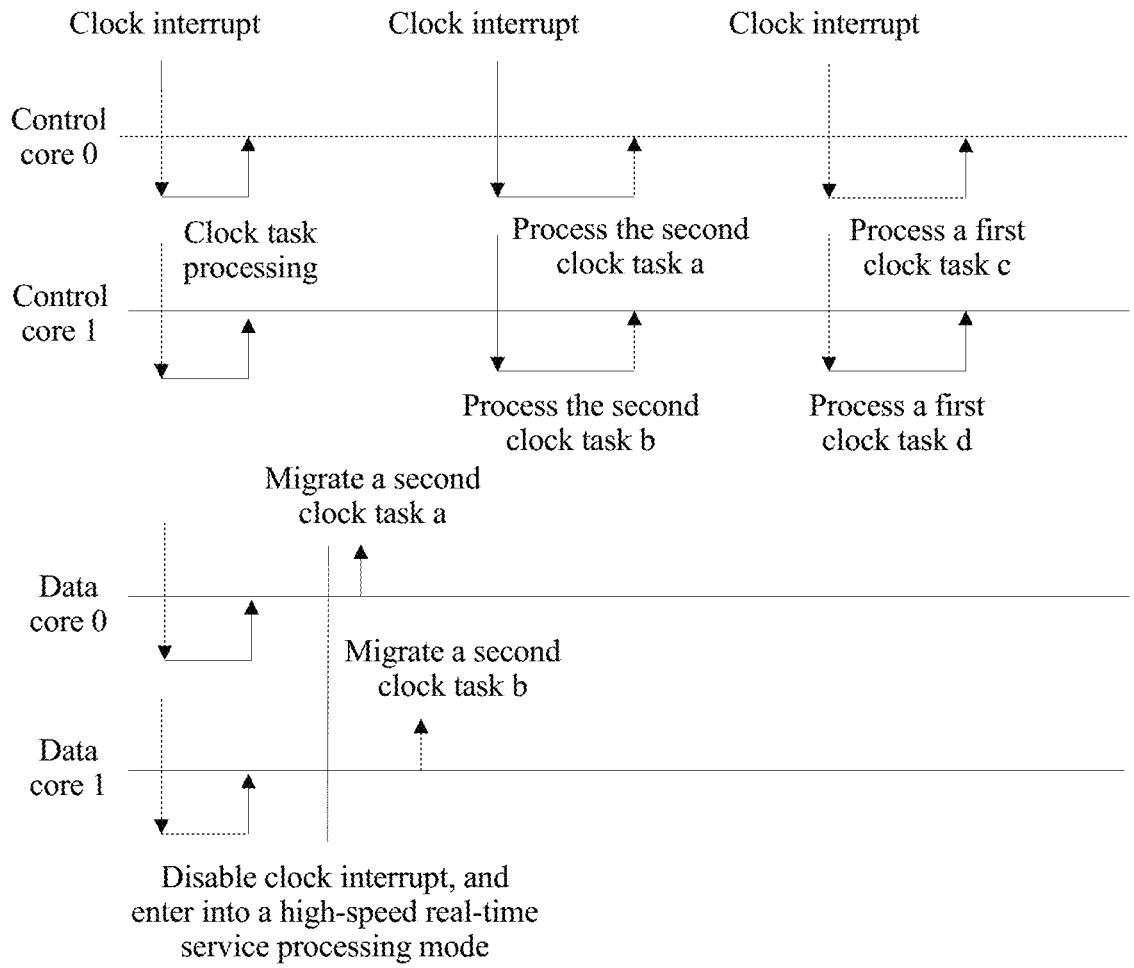
FIG. 4 is a flowchart of an example of service processing according to an embodiment of the present disclosure.

When no correspondence is set between a data core and a control core, a clock task in the data core does not need to be processed by a particular control core, and which control core is specifically used for processing may be determined according to any one or a combination of the following: operating system configuration, a task amount in a task queue of each control core, a load status of each control core, idle resources of each control core, and the like. The present disclosure imposes no limitation thereon. For example, in a flowchart of an example of service processing shown in FIG. 4, a control core 0 processes a second clock task a that is migrated from a data core 0 and a newly submitted first clock task c with respect to the data core 0. A control core 1 processes a second clock task b that is migrated from a data core 1 and a newly submitted second clock task d with respect to the data core 1.

Optionally, the clock task processing method provided in this embodiment of the present disclosure further includes the following:

the operating system detects a quantity of data packets of the to-be-processed service; and when the quantity of data packets is greater than a first threshold, the operating system changes a control core of the multiple control cores into a data core, so that the data core runs the at least one service process; or adds a data core other than the at least one data core of the multiple data cores, so that the added data core runs the at least one service process; or when the quantity of data packets is less than a second threshold, the operating system changes a data core of the at least one data core into a control core; where the first threshold is greater than the second threshold.

By using the foregoing method, the operating system may adjust, according to a service requirement and a load status of the at least one data core, quantities of data cores running the service process and the multiple control cores at any time, thereby improving expandability of the operating system and improving core resource utilization.

Optionally, the method further includes the operating system sets a flush flag for the multiple data cores and the multiple control cores, where the flush flag identifies that the operating system switches a process ASID group, so that the multiple data cores or the multiple control cores perform, according to the flush flag, TLB flushing during switching.

Conventionally, when a quantity of processes created by the operating system is an integral multiple of 256, switching of a process ASID group is triggered. The operating system sends an IPI to all the cores in the operating system, so as to instruct each core to perform TLB flushing. Therefore, a service delay and jitter occur if the data core is processing service data.

By using the foregoing manner, when switching of the process ASID group of the operating system is triggered, a flush flag is set for the multiple data cores and the multiple control cores. In this way, when any data core or control core performs process switching, the data core or the control core determines whether the data core or the control core has the flush flag. If the data core or the control core has the flush flag, the data core or the control core performs TLB flushing. When any data core of the at least one data core performs TLB flushing, the operating system has already restored the clock interrupt of the data core whose clock interrupt is previously disabled. In this way, an IPI interrupt is avoided when the data core processes service data, thereby further reducing service jitter and a service delay, and improving processing efficiency of the operating system.

According to the clock task processing method in the foregoing embodiment of the present disclosure, a multi-core computer operating system runs at least one service process of a to-be-processed service by using at least one data core of multiple data cores, disables a clock interrupt of the at least one data core, and then processes, by using at least one control core of multiple control cores, a clock task submitted by the at least one service process. There is no limitation on a sequence between the two steps of running the at least one service process by using the at least one data core and disabling the clock interrupt of the at least one data core, which are performed by the operating system. Before or when running the at least one service process by using the at least one data core, the operating system disables the clock interrupt of the at least one data core. Therefore, no clock interrupt occurs when the at least one data core subsequently runs the at least one service process, thereby reducing service jitter and a service delay, and improving processing efficiency of the operating system. In addition, the operating system processes, by using a control core that cannot process service data, a clock task submitted by the at least one service process. This can avoid a delay and congestion in clock task processing, and ensure that a service function of the operating system runs normally.

Figure 5:
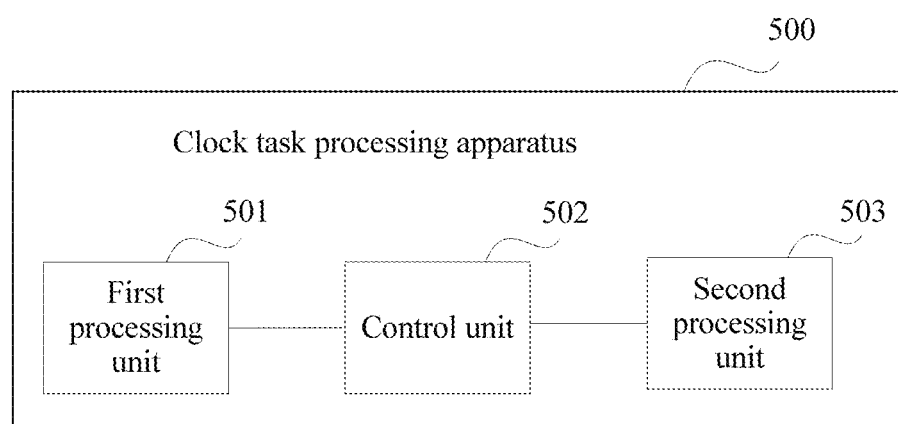
FIG. 5 is a schematic structural diagram of a clock task processing apparatus according to an embodiment of the present disclosure.

Based on the foregoing embodiments, the present disclosure further provides a clock task processing apparatus 500. The apparatus 500 is configured in a physical host including multiple data cores and multiple control cores. Referring to FIG. 5, the apparatus 500 includes a first processing unit 501, a control unit 502, and a second processing unit 503.

The first processing unit 501 is configured to run at least one service process of a to-be-processed service by using at least one data core of the multiple data cores.

Figure 6:
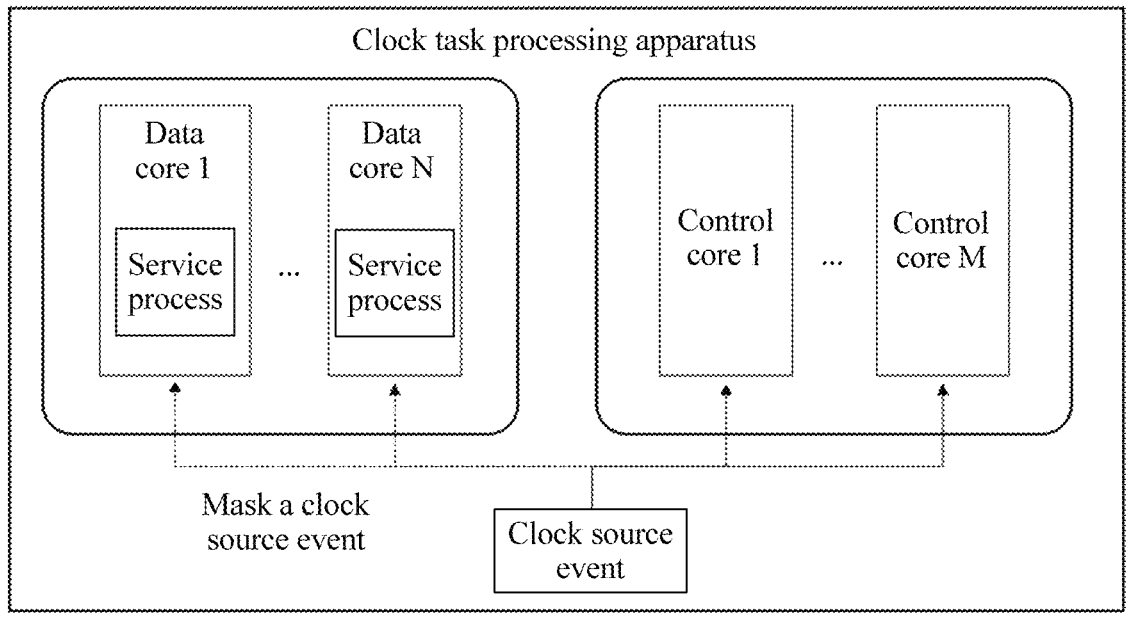
FIG. 6 is a diagram of an example of a clock task processing apparatus according to an embodiment of the present disclosure.

The control unit 502 is configured to disable a clock interrupt of the at least one data core. In an implementation manner shown in FIG. 6, the at least one data core runs the service process and masks a clock source event (the clock interrupt) after the control unit 502 disables the clock interrupt of the at least one data core.

The second processing unit 503 is configured to process, by using at least one control core of the multiple control cores, at least one first clock task submitted by the at least one service process. The at least one first clock task is a task completed by relying on a clock interrupt, and the at least one first clock task is submitted after the clock interrupt is disabled.

Optionally, the second processing unit 503 is specifically configured to submit, to a specified task queue, the at least one first clock task submitted by the at least one service process, where the at least one first clock task is obtained when the at least one data core runs the at least one service process; and process the at least one first clock task in the specified task queue by using the at least one control core.

Optionally, the apparatus 500 further includes a first migration unit, configured to migrate at least one second clock task in the at least one data core to the specified task queue after the control unit 502 disables the clock interrupt of the at least one data core, where the second clock task and the first clock task are of a same task type.

The second processing unit 503 is further configured to process, by using the at least one control core, the at least one second clock task that is migrated to the specified task queue.

Figure 7:
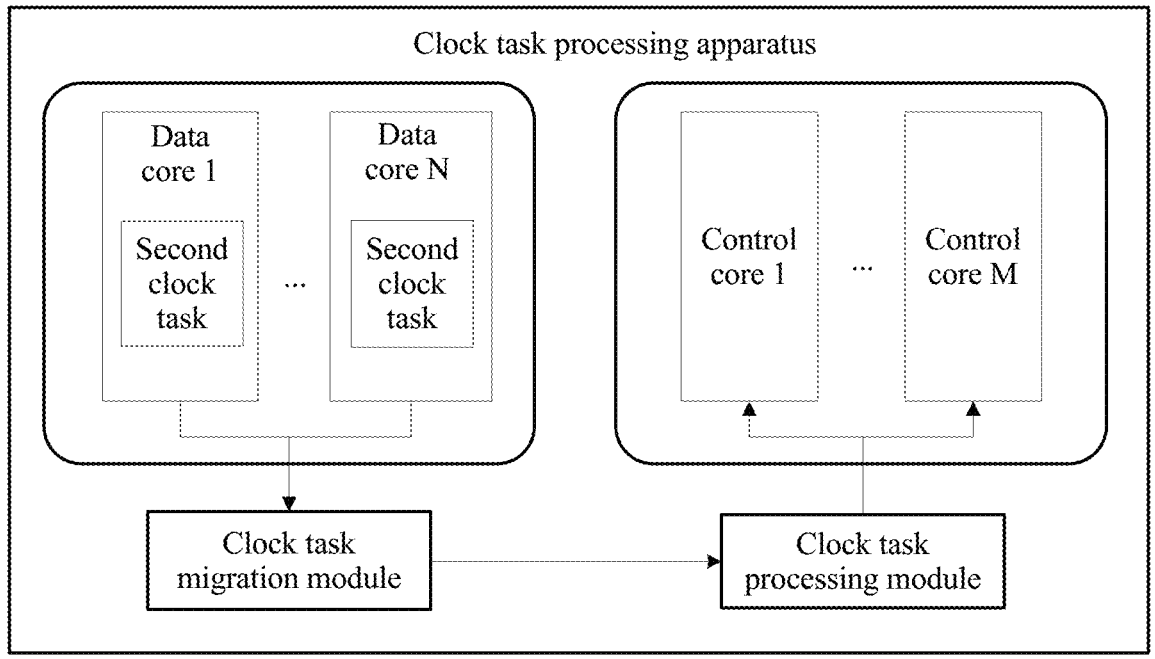
FIG. 7 is a diagram of an example of another clock task processing apparatus according to an embodiment of the present disclosure.

In an implementation manner, the first migration unit may be implemented by a clock task migration module shown in FIG. 7. A function of processing, by the at least one control core, the second clock task migrated to the specified task queue is implemented by a clock task processing module in the figure. It should be noted that the clock task processing module is set in each control core of the at least one control core. For brevity and clarity in FIG. 7, clock task processing functions of all control cores in the at least one control core are integrated into the clock task processing module. FIG. 7 merely schematically shows that the second clock task in the at least one data core is migrated and is processed by using the at least one control core.

Figure 8:
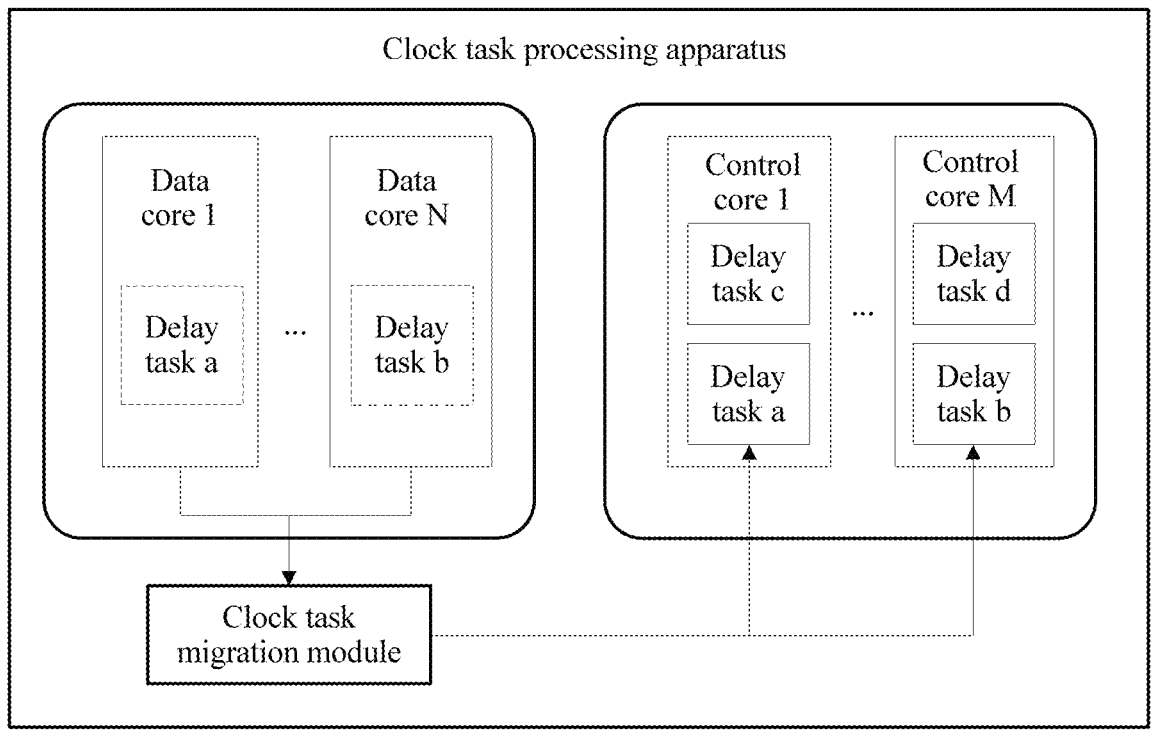
FIG. 8 is a diagram of an example of still another clock task processing apparatus according to an embodiment of the present disclosure.

In an implementation manner, when the second clock task in the at least one data core is a delay task, as shown in FIG. 8, the clock task migration module migrates a delay task a and a delay task b in the at least one data core to task queues of the multiple control cores, and processes a clock task in the respective task queue by using the clock task processing module of the at least one control core. For brevity and clarity, clock task processing modules of control cores in the at least one control core are not shown in the figure.

Figure 9:
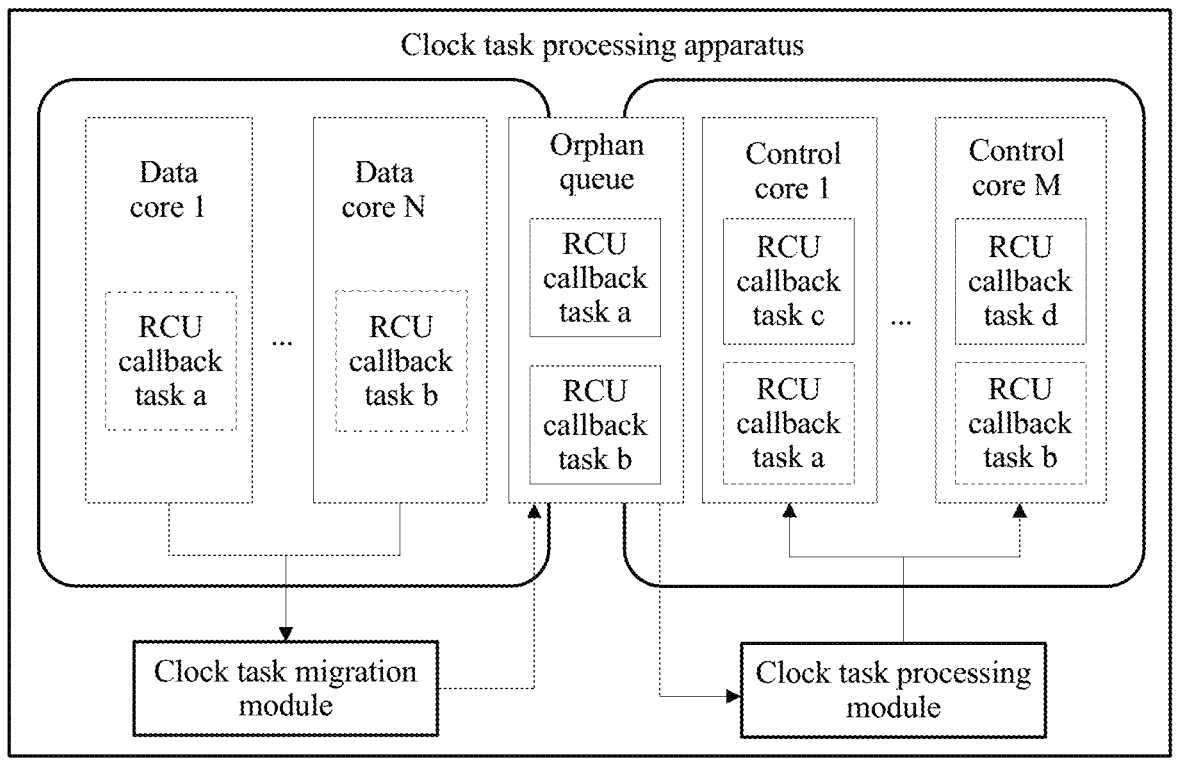
FIG. 9 is a diagram of an example of yet another clock task processing apparatus according to an embodiment of the present disclosure.

In an implementation manner, when the second clock task in the at least one data core is an RCU callback task, as shown in FIG. 9, the clock migration module migrates an RCU callback task a and an RCU callback task b in the at least one data core to a common orphan queue of the operating system, and processes the clock tasks in the orphan queue by using the clock task processing module of the at least one control core.

Optionally, the first clock task is a delay task, and the specified task queue is a task queue of the at least one control core.

When processing the at least one first clock task in the specified task queue by using the at least one control core, the second processing unit 503 is specifically configured to: during a clock interrupt corresponding to a time requirement of each first clock task of the at least one first clock task, process, by using the at least one control core, the first clock task that is corresponding to the clock interrupt and that is in the task queue of the at least one control core.

Optionally, the first clock task is a read-copy update RCU callback task, and the specified task queue is a common orphan queue in the apparatus 500.

When processing the at least one first clock task in the specified task queue by using the at least one control core, the second processing unit 503 is specifically configured to: during a clock interrupt corresponding to a time requirement of each first clock task of the at least one first clock task, process the first clock task that is corresponding to the clock interrupt and that is in the orphan queue after processing an RCU callback task in the at least one control core by using the at least one control core.

Optionally, when processing, by using the at least one control core, the first clock task that is corresponding to the clock interrupt and that is in the orphan queue, the second processing unit 503 is specifically configured to: process, according to status information reported by a control core of the at least one control core and by using the control core, the first clock task that is corresponding to the clock interrupt and that is in the orphan queue, where the status information indicates that an original target data core of the first clock task corresponding to the clock interrupt has already undergone a static state.

The status information is sent when the control core determines that the original target data core is not in a specified read critical section of a grace period at a moment of the clock interrupt, and determines that the original target data core has already undergone a static state. A start moment of the specified read critical section is prior to an enabling moment of the grace period. An end moment of the specified read critical section is within the grace period or beyond an end moment of the grace period.

Optionally, the apparatus 500 further includes a detection unit and an adjustment unit.

The detection unit is configured to detect a quantity of data packets of the to-be-processed service.

Figure 10:
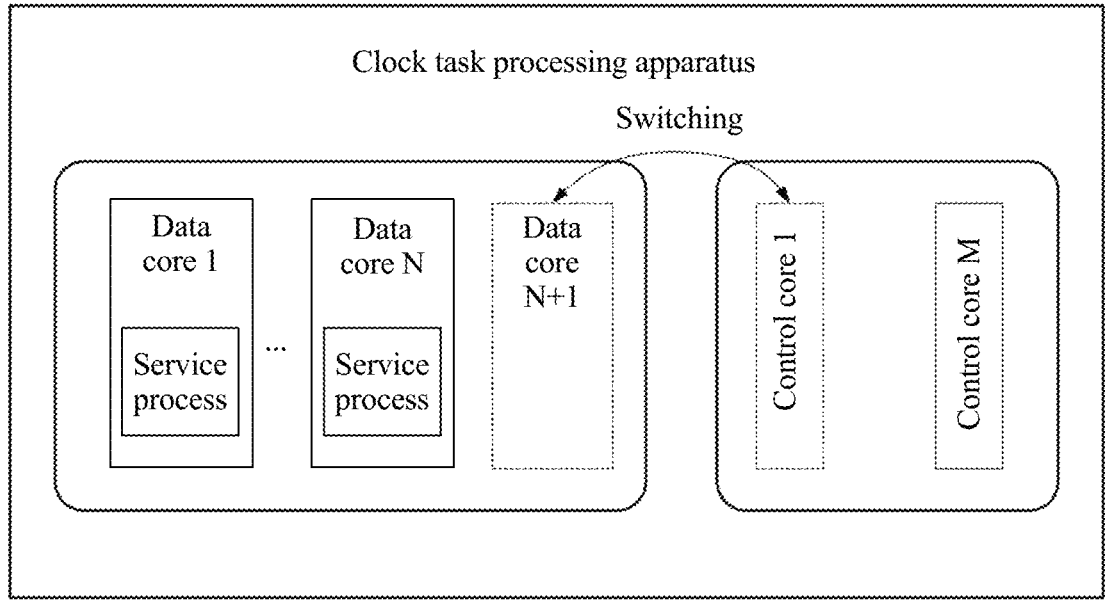
FIG. 10 is a diagram of an example of still yet another clock task processing apparatus according to an embodiment of the present disclosure.

The adjustment unit is configured to: when the quantity of data packets is greater than a first threshold, change a control core of the multiple control cores into a data core, so that the data core runs the at least one service process, as shown in FIG. 10; or add a data core other than the at least one data core of the multiple data cores, so that the added data core runs the at least one service process; or when the quantity of data packets is less than a second threshold, change a data core of the at least one data core into a control core, as shown in FIG. 10, where a quantity of data cores is greater than or equal to 2.

The first threshold is greater than the second threshold.

Figure 11:
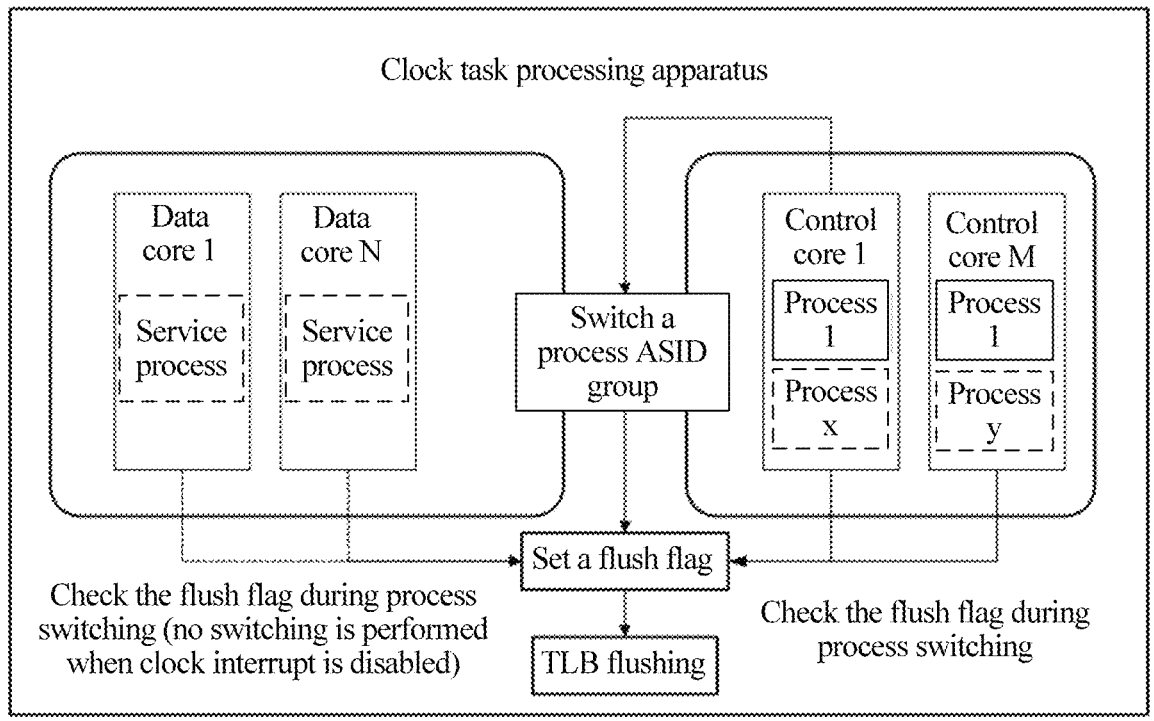
FIG. 11 is a diagram of an example of a further clock task processing apparatus according to an embodiment of the present disclosure.

Optionally, the apparatus 500 further includes a flag unit, configured to set a flush flag for the multiple data cores and the multiple control cores, where the flush flag indicates that the apparatus 500 switches a process address space identifier ASID group, so that at least one core of the multiple data cores and the multiple control cores performs, according to the flush flag, translation lookaside buffer TLB flushing during process switching. As shown in FIG. 11, any control core of the multiple control cores determines to switch a process ASID group. The flag unit sets a flush flag for each core of the apparatus 500. In this way, each core checks whether the core has the flush flag in respective process switching. When it is determined that the core has the flush flag, the core performs TLB flushing, and deletes the flush flag after TLB flushing.

Optionally, the apparatus 500 further includes a second migration unit, configured to when the at least one data core further runs another process, before the first processing unit 501 runs the at least one service process by using the at least one data core, and the control unit 502 disables the clock interrupt of the at least one data core, migrate the another process in the at least one data core to the multiple control cores, or migrate the another process in the at least one data core to a data core other than the at least one data core of the multiple data cores.

According to the clock task processing apparatus in the foregoing embodiment of the present disclosure, the apparatus runs at least one service process of a to-be-processed service by using at least one data core of multiple data cores, disables a clock interrupt of the at least one data core, and then processes, by using at least one control core of multiple control cores, a clock task submitted by the at least one service process. There is no limitation on a sequence between the two steps of running the at least one service process by using the at least one data core and disabling the clock interrupt of the at least one data core, which are performed by the apparatus. Before or when running the at least one service process by using the at least one data core, the apparatus disables the clock interrupt of the at least one data core. Therefore, no clock interrupt occurs when the at least one data core subsequently runs the at least one service process, thereby reducing service jitter and a service delay, and improving processing efficiency of the apparatus. In addition, the apparatus processes, by using a control core that cannot process service data, a clock task submitted by the at least one service process. This can avoid a delay and congestion in clock task processing, and ensure that a service function of the apparatus runs normally.

It should be noted that the unit division in the embodiments of the present disclosure is an example, and is merely logical function division and may be other division in actual implementation. Functional units in the embodiment of this application may be integrated into one processing unit, or each of the units may exist alone physically, or two or more units are integrated into one unit. For example, in the foregoing embodiment, the first processing unit 501 and the second processing unit 503 may be a same unit or may be different units. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The storage medium includes any medium that can store program code, such as a universal serial bus (USB) flash drive, a removable hard disk, a read-only memory (ROM), a random access memory (RAM), a magnetic disk, or an optical disc.

Figure 12:
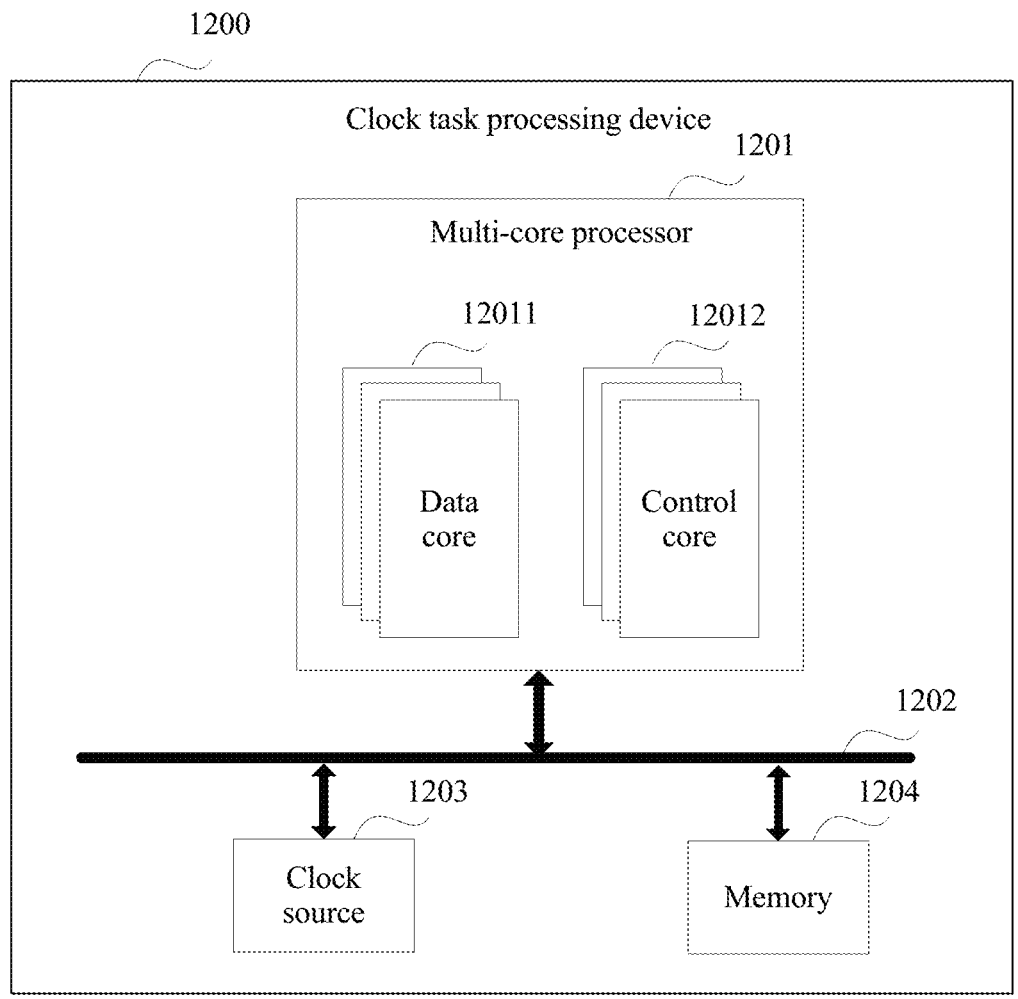
FIG. 12 is a schematic structural diagram of a clock task processing device according to an embodiment of the present disclosure.

Based on the foregoing embodiments, the present disclosure further provides a clock task processing device. As shown in FIG. 12, a device 1200 includes: a multi-core processor 1201, a communications bus 1202, a clock source 1203, and a memory 1204. The multi-core processor 1201 includes multiple cores, and the multiple cores are classified into multiple data cores 12011 and multiple control cores 12012.

The multi-core processor 1201, the clock source 1203, and the memory 1204 are connected to each other by using the communications bus 1202. The communications bus 1202 may be a peripheral component interconnect (PCI) communications bus, an extended industry standard architecture (EISA) communications bus, or the like. The communications bus 1202 may be may be classified as an address communications bus, a data communications bus, a control communications bus, or the like. For ease of representation, only one thick line is used in FIG. 12. However, this does not indicate that there is only one communications bus or one type of communications bus.

The clock source 1203 is configured to generate a clock interrupt, and synchronize the clock interrupt to each core of the multi-core processor 1201, or synchronize the clock interrupt to a specified core of the multiple cores. Then, the core broadcasts the clock interrupt to other cores in the multiple cores. The specified core is generally a first core of the multiple cores of the multi-core processor 1201, that is, a CPU 0.

At least one core of the multi-core processor 1201 is configured to implement the clock task processing method shown in FIG. 2 in the embodiment of the present disclosure. The method includes:

running at least one service process of a to-be-processed service by using at least one data core 12011 in the multiple data cores 12011;

disabling a clock interrupt of the at least one data core 12011; and processing, by using at least one control core 12012 in the multiple control cores 12012, at least one first clock task submitted by the at least one service process, where the at least one first clock task is a task completed by relying on a clock interrupt, and the at least one first clock task is submitted after the clock interrupt is disabled.

Optionally, that the at least one core processes, by using the at least one control core 12012, the at least one first clock task submitted by the at least one service process includes:

submitting, to a specified task queue, the at least one first clock task submitted by the at least one service process, where the at least one first clock task is obtained when the at least one data core 12011 runs the at least one service process; and processing the at least one first clock task in the specified task queue by using the at least one control core 12012.

Optionally, after the at least one core disables the clock interrupt of the at least one data core 12011, the method further includes:

migrating at least one second clock task in the at least one data core 12011 to the specified task queue, where the second clock task and the first clock task are of a same task type; and processing, by using the at least one control core 12012, the at least one second clock task that is migrated to the specified task queue.

Optionally, the first clock task is a delay task, and the specified task queue is a task queue of the at least one control core 12012.

That the at least one core processes, by using the at least one control core 12012, the at least one first clock task in the specified task queue includes: during a clock interrupt corresponding to a time requirement of each first clock task of the at least one first clock task, the first clock task that is corresponding to the clock interrupt and that is in the task queue of the at least one control core 12012 is processed by using the at least one control core 12012.

Optionally, the first clock task is an RCU callback task, and the specified task queue is a common orphan queue in the device.

That the at least one core processes, by using the at least one control core 12012, the at least one first clock task in the specified task queue includes: during a clock interrupt corresponding to a time requirement of each first clock task of the at least one first clock task, after an RCU callback task in the at least one control core 12012 is processed, the first clock task that is corresponding to the clock interrupt and that is in the orphan queue is processed by using the at least one control core 12012.

Optionally, that the at least one core processes, by using the at least one control core 12012, the first clock task that is corresponding to the clock interrupt and that is in the orphan queue includes: the first clock task that is corresponding to the clock interrupt and that is in the orphan queue is processed according to status information reported by a control core 12012 in the at least one control core 12012 and by using the control core 12012, where the status information indicates that an original target data core 12011 of the first clock task corresponding to the clock interrupt has undergone a static state.

The status information is sent when the control core 12012 determines that the original target data core 12011 is not in a specified read critical section of a grace period at a moment of the clock interrupt, and determines that the original target data core 12011 has already undergone a static state. A start moment of the specified read critical section is prior to an enabling moment of the grace period. An end moment of the specified read critical section is within the grace period or beyond an end moment of the grace period.

Optionally, the at least one core is further configured to:

detect a quantity of data packets of the to-be-processed service; and when the quantity of data packets is greater than a first threshold, change a control core 12012 in the multiple control cores 12012 into a data core 12011, so that the data core runs the at least one service process; or add a data core 12011 other than the at least one data core 12011 in the multiple data cores 12011, so that the added data core runs the at least one service process; or when the quantity of data packets is less than a second threshold, change a data core 12011 in the at least one data core 12011 into a control core 12012, where a quantity of data cores 12011 is greater than or equal to 2; where the first threshold is greater than the second threshold.

Optionally, the at least one core is further configured to set a flush flag for the multiple data cores 12011 and the multiple control cores 12012, where the flush flag indicates that the device switches a process address space identifier ASID group, so that at least one core of the multiple data cores 12011 or the multiple control cores 12012 performs, according to the flush flag, translation lookaside buffer TLB flushing during process switching.

Optionally, when the at least one data core 12011 further runs another process, before the at least one core runs the at least one service process by using the at least one data core 12011, and disables the clock interrupt of the at least one data core 12011, the method further includes the at least one core migrates the another process in the at least one data core 12011 to the multiple control cores 12012, or migrates the another process in the at least one data core 12011 to a data core 12011 other than the at least one data core 12011 in the multiple data cores 12011.

The device 1200 further includes a memory 1204, configured to store a program and the like. Specifically, the program may include program code, and the program code includes a computer operation instruction. The memory 1204 may include a (RAM, or may include a non-volatile memory, for example, at least one magnetic disk memory. The at least one core executes the instruction stored in the memory 1204, to implement the foregoing clock task processing method.

Optionally, the device 1200 further includes a user interface, configured to receive a clock interrupt control instruction sent by a user, for example, an instruction for disabling a clock interrupt or an instruction for restoring a clock interrupt.

Optionally, the device 1200 further includes a network interface, configured to receive a clock interrupt control instruction sent by another device that is connected to the device 1200, for example, an instruction for disabling a clock interrupt or an instruction for restoring a clock interrupt.

According to the device provided in this embodiment of the present disclosure, before or when running at least one service process by using at least one data core, the device disables a clock interrupt of the at least one data core. Therefore, no clock interrupt occurs when the at least one data core subsequently runs the at least one service process. The device reduces service jitter and a service delay, and processing efficiency of the device is improved. In addition, the device processes, by using a control core that cannot process service data, a clock task submitted by the at least one service process. This can avoid a delay and congestion in clock task processing, and ensure that a service function of the device runs normally.

In conclusion, according to the clock task processing method, apparatus, and device provided in the embodiments of the present disclosure, before or when running at least one service process by using at least one data core, a multi-core computer operating system disables a clock interrupt of the at least one data core. Therefore, no clock interrupt occurs when the at least one data core subsequently runs the at least one service process. The operating system reduces service jitter and a service delay, and processing efficiency of the operating system is improved. In addition, the operating system processes, by using a control core that cannot process service data, a clock task submitted by the at least one service process. This can avoid a delay and congestion in clock task processing, and ensure that a service function of the operating system runs normally.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to embodiments of the present disclosure without departing from the scope of the embodiments of the present disclosure. The present disclosure is intended to cover these modifications and variations provided that they fall within the scope of protection defined by the following claims and their equivalent technologies of the present disclosure.

What is claimed is:

1. A clock task processing method, wherein the clock task processing method is used in a multi-core computer operating system, wherein the multi-core computer operating system runs on a physical host comprising multiple data cores and multiple control cores, and wherein the method comprises:
    running at least one service process of a to-be-processed service using at least one data core of the multiple data cores;
    detecting, by the operating system, a quantity of data packets of the to-be-processed service;
    in response to the quantity of data packets being greater than a first threshold, changing a control core of the multiple control cores into a data core so that the data core runs the at least one service process;
    in response to the quantity of data packets being less than a second threshold, changing a data core of the at least one data core into a control core, wherein the first threshold is greater than the second threshold;
    obtaining at least one first clock task associated with the at least one service process in response to running the at least one service process using the at least one data core;
    disabling a clock interrupt of the at least one data core;
    migrating the at least one first clock task associated with the at least one service process in the at least one data core to a specified task queue associated with at least one control core of the multiple control cores after the clock interrupt of the at least one data core is disabled, wherein the at least one first clock task is a task completed using the clock interrupt; and
    processing the at least one first clock task using the at least one control core of the multiple control cores.

2. The method according to claim 1, wherein processing, using the at least one control core of the multiple control cores, the at least one first clock task submitted by the at least one service process comprises:
    submitting, by the operating system to the specified task queue, the at least one first clock task submitted by the at least one service process, wherein the at least one first clock task is obtained when the at least one data core runs the at least one service process; and
    processing, by the operating system, the at least one first clock task in the specified task queue using the at least one control core.

3. The method according to claim 2, wherein after disabling, by the operating system, the clock interrupt of the at least one data core, the method further comprises:
migrating, by the operating system, at least one second clock task in the at least one data core to the specified task queue, wherein the second clock task and the first clock task are of a same task type; and
processing, using the at least one control core, the at least one second clock task that is migrated to the specified task queue.

4. The method according to claim 2, wherein the first clock task is a delay task, wherein the specified task queue is a task queue of the at least one control core, and wherein processing, by the operating system, the at least one first clock task in the specified task queue using the at least one control core comprises, processing, during a clock interrupt corresponding to a time requirement of each first clock task of the at least one first clock task and by the operating system using the at least one control core, the first clock task that corresponds to the clock interrupt and that is in the task queue of the at least one control core.

5. The method according to claim 2, wherein the first clock task is a read-copy update (RCU) callback task, wherein the specified task queue is an orphan queue in the operating system, and wherein processing, by the operating system, the at least one first clock task in the specified task queue using the at least one control core comprises processing, during a clock interrupt corresponding to a time requirement of each first clock task of the at least one first clock task and by the operating system, the first clock task that corresponds to the clock interrupt and that is in the orphan queue after processing an RCU callback task in the at least one control core using the at least one control core.

6. The method according to claim 5, wherein processing, by the operating system using the at least one control core, the first clock task that corresponds to the clock interrupt and that is in the orphan queue comprises processing, by the operating system according to status information reported by a control core of the at least one control core and using the control core, the first clock task that corresponds to the clock interrupt and that is in the orphan queue, wherein the status information indicates that an original target data core of the first clock task corresponding to the clock interrupt has already undergone a static state, wherein the status information is sent when the control core determines that the original target data core is not in a specified read critical section of a grace period at a moment of the clock interrupt and that the original target data core has already undergone a static state, wherein a start moment of the specified read critical section is prior to an enabling moment of the grace period, and wherein an end moment of the specified read critical section is within the grace period or beyond an end moment of the grace period.

7. The method according to claim 1, wherein the method further comprises:
when the quantity of data packets is greater than a first threshold, adding a data core other than the at least one data core of the multiple data cores so that the added data core runs the at least one service process.

8. A clock task processing device, comprising:
a multi-core processor including multiple data cores and multiple control cores;
a memory storing instructions;
a clock source; and
a communications bus, wherein the multi-core processor, the clock source, and the memory are coupled using the communications bus,
wherein the clock source is configured to:
generate a clock interrupt; and
synchronize the clock interrupt to a core of the multi-core processor, and wherein the multi-core processor is configured to invoke the instructions to perform operations comprising:
running at least one service process of a to-be-processed service using at least one data core of the multiple data cores;
detecting, by the operating system, a quantity of data packets of the to-be-processed service;
when the quantity of data packets is greater than a first threshold, changing a control core of the multiple control cores into a data core so that the data core runs the at least one service process;
when the quantity of data packets is less than a second threshold, changing, by the operating system, a data core of the at least one data core into a control core, wherein the first threshold is greater than the second threshold;
obtaining at least one first clock task associated with the at least one service process in response to running the at least one service process using the at least one data core;
disabling a clock interrupt of the at least one data core;
migrating the at least one first clock task associated with the at least one service process in the at least one data core to a specified task queue associated with at least one control core of the multiple control cores after the clock interrupt of the at least one data core is disabled, wherein the at least one first clock task is a task completed using the clock interrupt; and
processing the at least one first clock task using the at least one control core of the multiple control cores.

9. The clock task processing device according to claim 8, wherein processing, using the at least one control core of the multiple control cores, the at least one first clock task submitted by the at least one service process comprises:
submitting, to the specified task queue, the at least one first clock task submitted by the at least one service process, wherein the at least one first clock task is obtained when the at least one data core runs the at least one service process; and
processing the at least one first clock task in the specified task queue using the at least one control core.

10. The clock task processing device according to claim 9, wherein the operations further comprise, after disabling the clock interrupt of the at least one data core:
migrating at least one second clock task in the at least one data core to the specified task queue, wherein the second clock task and the first clock task are of a same task type; and
processing, using the at least one control core, the at least one second clock task that is migrated to the specified task queue.

11. The clock task processing device according to claim 9, wherein the first clock task is a delay task, wherein the specified task queue is a task queue of the at least one control core, and wherein processing the at least one first clock task in the specified task queue using the at least one control core comprises processing, during a clock interrupt corresponding to a time requirement of each first clock task of the at least one first clock task and using the at least one control core, the first clock task that is corresponding to the clock interrupt and that is in the task queue of the at least one control core.

12. The clock task processing device according to claim 9, wherein the first clock task is a read-copy update (RCU) callback task, wherein the specified task queue is an orphan queue in the operating system, and wherein processing the at least one first clock task in the specified task queue using the at least one control core comprises processing, during a clock interrupt corresponding to a time requirement of each first clock task of the at least one first clock task, the first clock task that corresponds to the clock interrupt and that is in the orphan queue after processing an RCU callback task in the at least one control core using the at least one control core.

13. The clock task processing device according to claim 12, wherein processing, by the operating system using the at least one control core, the first clock task that corresponds to the clock interrupt and that is in the orphan queue comprises processing, according to status information reported by a control core of the at least one control core and using the control core, the first clock task that corresponds to the clock interrupt and that is in the orphan queue, wherein the status information indicates that an original target data core of the first clock task corresponding to the clock interrupt has already undergone a static state, wherein the status information is sent when the control core determines that the original target data core is not in a specified read critical section of a grace period at a moment of the clock interrupt and that the original target data core has already undergone a static state, wherein a start moment of the specified read critical section is prior to an enabling moment of the grace period, and wherein an end moment of the specified read critical section is within the grace period or beyond an end moment of the grace period.

14. The clock task processing device according to claim 8, wherein the operations further comprise:
when the quantity of data packets is greater than a first threshold, adding a data core other than the at least one data core of the multiple data cores so that the added data core runs the at east one service process.

15. A non-transitory computer-readable storage medium comprising instructions which, when executed by a computer that comprises multiple data cores and multiple control cores, cause the computer to perform operations comprising:
running at least one service process of a to-be-processed service using at least one data core of the multiple data cores;
detecting, by the operating system, a Quantity of data packets of the to-be-processed service;
when the quantity of data packets is greater than a first threshold, changing a control core of the multiple control cores into a data core so that the data core runs the at least one service process;
when the quantity of data packets is less than a second threshold, changing a data core of the at least one data core into a control core, wherein the first threshold is greater than the second threshold;
obtaining at least one first clock task associated with the at least one service process in response to running the at least one service process using the at least one data core;
disabling a clock interrupt of the at least one data core;
migrating the at least one first clock task associated with the at least one service process in the at least one data core to a specified task queue associated with at least one control core of the multiple control ores after the clock interrupt of the at least one data core is disabled, wherein the at least one first clock task is a task completed using the clock interrupt; and
processing the at least one first clock task submitted by the at least one service process using the at least one control core of the multiple control cores.

16. The non-transitory computer-readable storage medium according to claim 15, wherein processing, using at least one control core of the multiple control cores, the at least one first clock task submitted by the at least one service process comprises:
submitting, to the specified task queue, the at least one first clock task submitted by the at least one service process, wherein the at least one first clock task is obtained when the at least one data core runs the at least one service process; and
processing the at least one first clock task in the specified task queue using the at least one control core.

17. The non-transitory computer-readable storage medium according to claim 16, wherein the first clock task is a delay task, wherein the specified task queue is a task queue of the at least one control core, and wherein processing the at least one first clock task in the specified task queue using the at least one control core comprises processing, during a clock interrupt corresponding to a time requirement of each first clock task of the at least one first clock task, and using the at least one control core, the first clock task that corresponds to the clock interrupt and that is in the task queue of the at least one control core.

18. The non-transitory computer-readable storage medium according to claim 15, wherein the operations further comprise, after disabling the clock interrupt of the at least one data core:
migrating at least one second clock task in the at least one data core to the specified task queue, wherein the second clock task and the first clock task are of a same task type; and
processing, by using the at least one control core, the at least one second clock task that is migrated to the specified task queue.

* * * * *

UNITED STATES PATENT AND TRADEMARK OFFICE
CERTIFICATE OF CORRECTION

PATENT NO. : 10,891,171 B2  
APPLICATION NO. : 15/901291  
DATED : January 12, 2021  
INVENTOR(S) : Xuesong Pan, Jianfeng Xiu and Zichang Lin Page 1 of 1

It is certified that error appears in the above-identified patent and that said Letters Patent is hereby corrected as shown below:

On the Title Page

(54) Title: "Method, Apparatus and Device for Transitioning Between Data and Control Core and Migrating Clock Task from Data Core to Control Core" should read "Clock Task Processing Method, Apparatus and Device for a Control Core and Data Core"

In the Claims

Claim 15, Column 23, Line 46: "a Quantity of data" should read "a quantity of data"

Claim 15, Column 24, Line 11: "control ores after the" should read "control cores after the"

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*